United States Patent [19]
Kosakai

[11] 3,956,795
[45] May 18, 1976

[54] BROOCH SERVING AS A GLASSES HANGER

[76] Inventor: Michiko Kosakai, 28-14, 2-chome, Ehara-cho, Nakano, Tokyo, Japan

[22] Filed: Aug. 6, 1974

[21] Appl. No.: 495,538

[30] Foreign Application Priority Data
Jan. 19, 1974    Japan ................. 49-9202[U]

[52] U.S. Cl. .................................. 24/3 R; 63/1 R
[51] Int. Cl.² .................................. A44B 21/00
[58] Field of Search .............. 63/1 R, 20; 24/3 R, 24/3 A, 3 B, 3 C, 3 D, 3 E, 3 F, 3 G, 13, 30.5 L, 85 A, 86 A, 73 R

[56] References Cited
UNITED STATES PATENTS

| | | | |
|---|---|---|---|
| 325,117 | 8/1885 | Schroder | 63/20 X |
| 429,208 | 6/1890 | Doty | 24/85 A |
| 640,807 | 1/1900 | Polhemus | 24/13 |
| 643,288 | 2/1900 | Heineman | 24/86 A X |
| 1,141,992 | 6/1915 | Toelcke | 24/13 |
| 1,176,025 | 3/1916 | Bohlim | 24/13 |
| 1,404,478 | 1/1922 | Podolsky | 24/3 |
| 2,490,908 | 12/1949 | Kohler | 63/14 F |

FOREIGN PATENTS OR APPLICATIONS

| | | | |
|---|---|---|---|
| 1,138,243 | 1/1957 | France | 63/20 |

*Primary Examiner*—F. Barry Shay
*Attorney, Agent, or Firm*—Wenderoth, Lind & Ponack

[57] ABSTRACT

A brooch comprising a main body including an ornamental front surface, and a frame slidably mounted on a rear surface of the main body. By slidably moving the frame downwardly of the main body, it is possible to hang one of the bows of glasses on the frame so as to thereby hang the glasses from the brooch.

1 Claim, 2 Drawing Figures

U.S. Patent  May 18, 1976  3,956,795
FIG.2
FIG.1
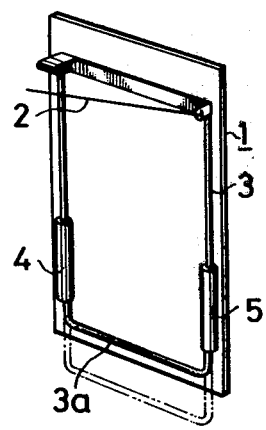
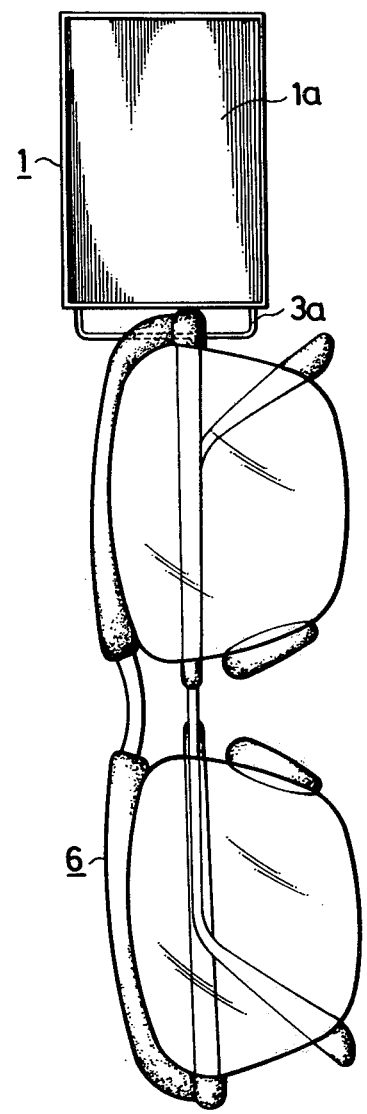

BROOCH SERVING AS A GLASSES HANGER

This invention relates to brooch, and more particularly it is concerned with a brooch capable of serving as a glasses hanger.

Heretofore, there have been many types of glasses hangers available but none of them have been satisfactory from the ornamental point of view.

Accordingly, this invention has as its object the provision of a brooch which is capable of serving as a glasses hanger and which has a high ornamental value.

The outstanding characteristic of the invention is that the brooch can serve the purposes of both being an ornamental object and a glasses hanger.

Additional and other objects and features of the invention will become evident from the description set forth hereinafter when considered in conjunction with the accompanying drawings, in which:

FIG. 1 is a perspective view looking from the rear of the brooch embodying the present invention; and FIG. 2 is a front view of the brooch of FIG. 1 shown when used as a glasses hanger.

The invention will now be described in detail with reference to the embodiment shown in the drawings. 1 is a main body of the brooch including a front surface 1a which has a decorative pattern or design in different colors superposed thereon (not shown) so that the front surface 1a may serve as an ornamental surface. A pin 2 is attached at one end thereof to a rear surface of the main body 1. A substantially U-shaped frame 3 attached to the rear surface of the main body 1 includes a pair of vertical members supported by tubular members 4 and 5 respectively for up and down sliding motion by a suitable frictional force, and a horizontal member 3a connecting the lower ends of the vertical members and serving as a glasses hanging bar.

In operation, the pin 2 is stuck into a portion of the clothes to fasten the main body 1 of the brooch thereto, so that the brooch can serve as an ornament. When it is desired to hang glasses from the main body 1 of the brooch, the frame 3 is slidably moved downwardly against the frictional dragging of the support members 4 and 5 on the vertical members of the frame 3. Thus, the horizontal member 3a of the frame 3 can be made to extend downwardly and one of the bows of the glasses 6 can be hung thereon. If the frame 3 is moved upwardly after the glasses 6 are removed from the horizontal member 3a of the frame 3, then the horizontal member 3a or glasses hanging bar is hidden behind the main body 1 of the brooch and cannot be seen from outside.

The brooch according to the invention is constructed as aforementioned. It will be appreciated that the brooch according to the invention can serve the dual purpose of being an ornament and a glasses hanger when the glasses are not in use. The brooch according to the invention can serve as a glasses hanger without spoiling the beauty of the brooch as an ornament and without damaging the ornamental front surface of the brooch. It should be noted that the brooch according to the invention can serve the purpose of hanging not only glasses but also a handkerchief, ribbon, scarf or the like. It will be appreciated that the brooch according to the invention has the effect of not only being satisfactory as an ornament but also as being useful as a hanger.

What I claim is:

1. An ornamental device to be fastened to clothing and the like to hold glasses and other objects, said device comprising:

a main body having an ornamental front surface;

fastening means attached to the back surface of the main body for fastening the device to clothing and the like;

holding means attached to the back surface of and hidden from frontal view by the ornamental front surface of said main body, said holding means extendable from the bottom edge of said main body for holding objects hung thereover, said holding means comprised of:

two, parallel, vertical, tubular members spaced from each other and attached directly to the back of said main body, and a moveable U-shaped member frictionally fitted at each vertical section thereof into one of said vertical tubular members, with the horizontal member of the U-shape extending between the vertical sections beneath the vertical tubular members, whereby extending the U-shaped member beyond the edge of the main body while being frictionally held by the vertical tubular members provides a horizontal support at the bottom horizontal part of the U-shape for holding an object and whereby forcing the U-shaped member upward behind the ornamental front surface completely hides the U-shaped member from frontal view.

* * * * *